United States Patent Office 3,477,994
Patented Nov. 11, 1969

3,477,994
MODIFIED POLYOXYMETHYLENE
Carl Earle Schweitzer and Robert Alton Setterquist, Wilmington, Del., assignors to E. I. du Pont de Nemours and Company, Wilmington, Del., a corporation of Delaware
No Drawing. Continuation-in-part of application Ser. No. 442,545, Mar. 24, 1965. This application Aug. 2, 1966, Ser. No. 574,273
The portion of the term of the patent subsequent to Apr. 8, 1986, has been disclaimed
Int. Cl. C08g *1/22, 37/00*
U.S. Cl. 260—67          6 Claims

ABSTRACT OF THE DISCLOSURE

A process for modifying a high molecular weight polyoxymethylene by the addition of units different from polyoxymethylene either at the ends of the polymer chain and/or within the polymer chain which consists of contacting the polyoxymethylene with dioxolane, polydioxolane, or selected substituted formals, e.g. 5-phenol-1,3-dioxane in the presence of a Lewis acid, e.g. boron trifluoride etherate and at a temperature in the range 0–200° C. optionally in the presence of a diluent, e.g. toluene.

---

This application is a continuation-in-part of copending application, Ser. No. 442,545, filed Mar. 24, 1965, by Carl E. Schweitzer and Robert A. Setterquist, which, in turn, is a continuation-in-part of Ser. No. 124,021, now U.S. Patent 3,183,211, issued May 11, 1965, to K. C. Brinker and Carl E. Schweitzer.

This invention relates to a novel process for preparing stable, modified polyoxymethylenes, and, more particularly, it relates to the modification of polyoxymethylenes having a number average molecular weight of at least 10,000 by reacting a polyoxymethylene with a selected group of formals to obtain a modified polyoxymethylene having a number average molecular weight of at least 10,000. This product can have improved chemical properties, e.g., stability towards bases, and, if desired, modified physical properties, e.g., decreased melting point, as compared to the untreated polymer.

One part by weight of polyoxymethylene starting material having a number average molecular weight of at least 10,000, is reacted with 0.1 to 50 parts by weight of a formal described hereinbelow in a mildly acidic reaction medium, e.g., in the presence of 0.0001 to 0.1 part by weight based upon the polymer of an acid, and, preferably, a Lewis acid, such as boron trifluoride, and thereafter a polyoxymethylene having a number average molecular weight of at least 10,000 is recovered.

The formals which are operable in the process of the present invention are dioxolane, polydioxolane and those formals having the formulae (1)
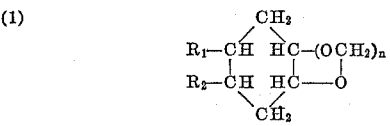

wherein $R_1$ and $R_2$ are hydrogen or alkyl groups of 1–3 carbon atoms and when $R_1$ is hydrogen, $R_2$ may also be aryl or alkaryl groups having 6–10 carbon atoms and $n$ is 1 or 2;

(2)
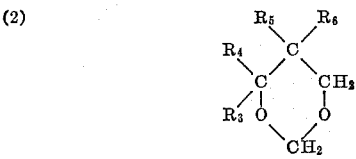

wherein $R_3$ is a group selected from the class consisting of phenyl, $-(CH_2)_m-CN$, $-(CH_2)_m-COOR$ and hydrogen, wherein $m$ is 0–3 and R is an alkyl group 1–4 carbon atoms; $R_4$ and $R_5$ are selected from the class consisting of hydrogen and alkyl groups having 1–4 carbon atoms; $R_6$ is selected from the class consisting of hydrogen and when $R_3$ is hydrogen, $R_6$ is a group selected from the class consisting of phenyl, $-(CH_2)_m-CN$, and $$-(CH_2)_m-COOR$$

wherein $m$ is 0–3 and R is an alkyl group having 1–4 carbon atoms; and (3)
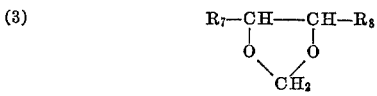

wherein $R_7$ is hydrogen or an alkyl group having 1–4 carbon atoms and $R_8$ is a group selected from the class $-(CH_2)_m-CN$ and $-(CH_2)_m-COOR$, wherein $m$ is 0–3 and R is an alkyl group having 1–4 carbon atoms.

Examples of compounds within the above definitions are 5,6-dipropylhexahydrobenzo-1,3-dioxolane
cis- and trans-hexahydrobenzo-1,3-dioxolane
5-phenylhexahydrobenzo-1,3-dioxolane
trans-hexahydrobenzotrioxepane
5-methylhexahydrobenzo-1,3,5,-trioxepane
4-phenyl-1,3-dioxane
4-cyano-1,3-dioxane
4-carbomethoxy-1,3-dioxane
4-carbobutoxy-1,3-dioxane
5-methyl-5-cyano-1,3-dioxane
4-carbethoxy-5-propyl-1,3-dioxane
4-propyl-4-carbomethoxy-5-methyl-1,3-dioxane
4-cyanomethyl-1,3-dioxane
4-carbethoxy-1,3-dioxolane
5-methyl-5-carbethoxy-1,3-dioxane
4-carbomethoxymethyl-1,3-dioxane
4-carbobutoxymethyl-1,3-dioxane
4-cyanomethyl-5-methyl-1,3-dioxane
4-cyanomethyl-5-propyl-1,3-dioxane
4-methyl-4-carbethoxymethyl-1,3-dioxane
4-(3-cyanopropyl)-1,3-dioxane
4-(3-carbethoxypropyl)-1,3-dioxane
4-(3-carbomethoxypropyl)-4-methyl-5-propyl-1,3-dioxane
5-cyanomethyl-1,3-dioxane
5-(3-carbobutoxypropyl)-1,3-dioxane
4-methyl-5-(2-carbethoxyethyl)-1,3-dioxane
4-methyl-4-phenyl-1,3-dioxane
4-phenyl-5-propyl-1,3-dioxane
5-phenyl-1,3-dioxane
4-cyano-1,3-dioxolane
4-carbobutoxy-1,3-dioxolane
4-carbethoxy-5-propyl-1,3-dioxolane
4-cyanomethyl-1,3-dioxolane
4-carbethoxymethyl-1,3-dioxolane
4-(3-carbomethoxypropyl)-1,3-dioxolane
4-(3-cyanopropyl)-5-propyl-1,3-dioxolane
4-(3-carbobutoxypropyl)-5-propyl-1,3-dioxolane
4-(2-carbethoxyethyl)-1,3-dioxolane.

Linear formals derived from the cyclic formals described hereinabove and linear formals which are structurally similar to poly 1,3-dioxolane are included in that term, e.g., the linear polymer of ethylene glycol and formaldehyde. Examples of these formals are found in United States Patents 2,350,350, issued June 6, 1945, to W. F. Gresham; 2,395,265, issued Feb. 19, 1946, to W. F. Gresham and 2,475,610, issued July 12, 1949, to W. F. Gresham et al. Other compounds such as cyclohexene oxide, phenyl glycidyl ether and styrene oxide, may be employed to modify polyoxymethylene as described hereinbelow and according to the process of U.S Patent 3,183,211 issued to K. C. Brinker et al. on May 11, 1965.

The polyoxymethylene starting material employed in the process of this invention is a polymer having chains of recurring oxymethylene units (—$CH_2O$—) or chains containing a predominance of the aforementioned units with the chain normally terminated at each end by a hydroxyl group, an alkyl group, hydroxyalkyl, or an ester group. Usually, at least one of the two terminal groups of the chain of the starting polymer is a hydroxyl group. Polyoxymethylenes having alkyl or hydroxyalkyl groups (ether linkages) on the ends of the polymer chain are base stable but may be modified by the process of the present invention.

Polymers which have been modified according to the process of the present invention can have chains which are predominately (—$CH_2O$—) units with base stable ends and/or can contain from 0.3 to 10 mole percent of a unit intercalated therein, i.e., inserted into the main chain of the polymer. The intercalation results in the introduction of at least one —C—C— linkage into the main chain of the polymer. As the number of intercalated units in the main chain of the polymer increases, the melting point of the polymer decreases. The decrease in melting point of the polymer improves the processability of the polymer, i.e., permits molding over a wider temperature range. Reactive groups may be present in the compound which is intercalated into the polymer chain or attached to the end of the polymer chain. This will result in a polymer having reactive sites or groups.

The preferred catalysts for the process of the present invention are phosphorus pentafluoride, triethyl oxonium fluoborate and boron trifluoride. Examples of other acids or acid-reacting compounds that may be used as catalysts within the scope of this invention to provide a mildly acidic reaction medium include Lewis acids usually of the Friedel-Crafts type, such as aluminum trichloride, titanium tetrachloride, boron trichloride, antimony trichloride, antimony pentachloride, antimony pentafluoride; protonic or Bronsted acids with a pKa of less than 5.5, including organic acids such as hydroxyacetic, trichloroacetic, and para-toluene sulfonic and inorganic acids such as sulfuric, hydrochloric and phosphoric acids and the like. The salts of strong acids (pKa less than 2.0) with weak bases may also be used. The acid catalyst should be compatible with the formals, i.e., should not form insoluble complexes therewith in the case of the slurry or solution process, and should not form nonvolatile complexes in the case of a vapor process. Strong acids and acids which are strong oxidizing or reducing agents are not preferred and, if used, should be used sparingly to prevent excessive degradation of the polymer by causing the reaction medium to be more than mildly acidic. Excessive degradation may also be avoided by adding these acids in such a manner that the contact time of the acid with the polymer is held at a minimum. The preferred range of concentration of acid catalysts, excluding the Lewis acids, is from 0.001–0.05 part per part of polymer. The same range is preferred for their salts with weak bases. Certain complexes of the aforementioned acid halides are operable in the present invention and may be preferred when it is desired to employ a liquid catalyst, e.g., ether complexes, the preferred ether being dibutyl ether. Examples of other ethers are the dialkyl ethers, such as dimethyl ether, diethyl ether, and dipropyl ether. The complex of the Lewis acids with ether may be prepared by mixing the respective materials in a suitable solvent. The catalyst complex may also be prepared by adding the Lewis acid to the ether. The resultant product which is an ether complex is more easily manipulated than some of the aforementioned gases.

It may be observed from the following examples that the reaction conditions for accomplishing the modification, i.e., stabilization and/or intercalation as set forth in the present application using formals, are not restricted, but, on the contrary, offer a wide variety of conditions which may be used in the different embodiments of the invention. For instance, the examples illustrate the fact that the modification of polyoxymethylene can be accomplished in any compatible medium in which the polymer can be intimately contacted with the desired modifying agent. A compatible medium should be an inert liquid hydrocarbon such as toluene or ether, but any material which does not react with the polymer or the formal and does not excessively deactivate the catalyst may be employed. The modifying reagent and catalyst may be in the vapor phase, while the polyoxymethylene is present as a solid. Inert gases, such as nitrogen and carbon dioxide, which are relatively pure, may be added as diluents to the vapor in the case where the modifying reagent and the catalyst are in the vapor phase, while the polyoxymethylene is present as a solid during the reaction. Solvents which may be employed in a solution process to modify the end groups of the polyoxymethylene may be 1,4-dioxane, nitrobenzene, and tetramethylene sulfone, while nonsolvents may include ethers, hydrocarbons, alkylene and alkyl halide and like compounds which are familar to skilled chemists.

The time of reaction may be as long as is necessary to reach completion of the reaction without excessive decomposition of the unstabilized polymer. With long reaction times, temperatures as low as 0° C. may be employed and with short reaction times, temperatures as high as 200° C. may be employed. The process may be performed under pressure if the selected reactants or conditions so dictate. The temperature, time, concentration of reactants and strength of catalyst must be balanced, as in most other reactions, so as to cause an acceptable amount of reaction in a reasonable time. The chains of the polymer are susceptible to attack by acids and may be cleaved by such an attack; therefore, it is important to adjust the reaction temperature and time so that he cleavage and oher side reactions that take place are slow enough and yet the modification of the polymer is fast enough to obtain an acceptable product.

Generally, impurities which adversely affect the polymerization of anhydrous formaldehyde to high molecular weight polymers and oxygen should be avoided in this process.

In the preferred embodiment of the process of this invention, the reaction is carried out in an inert hydrocarbon medium and the temperature is between 25 and 150° C.; the poliyoxymethylene is present as a solid; the preferred stabilizing agent, 1,3-dioxolane, is present at a concentration of 0.5–20 parts per part of polyoxymethylene and the preferred catalyst, boron trifluoride dibutyl etherate, is present at a concentration of 0.001–0.05 part by weight based upon the polymer.

The polymer treated according to the present process may possess sufficient thermal stability to be molded without further refining; however, it is desirable to neutralize the catalyst and to remove unreacted polyoxymethylene. A suitable method for such refining includes dissolving the polymer in the absence of oxygen in a solution containing an amine or caustic, and heating the solution to depolymerize unreacted polymer. Solvents which may be used in the presence of an amine include the aliphatic and aromatic hydroxy compounds, such as cyclohexanol, ethylene glycol, benzyl alcohol and phenol. The preferred solvents for caustic treatment are benzyl alcohol or cyclohexanol. Amines and caustics which are useful in the purification step include triethylamine, tripropylamine, tributylamine, sodium hydroxide, and potassium hydroxide. Another procedure which may be employed for removing the unreacted polyoxymethylene is thermal degradation of the polymer either solid, molten or in solution without addition of an amine or a caustic after removal or deactivation of the catalyst.

The number average molecular weight of the starting polymer and poducts herein may be measured by the classical methods of osmometry. However, this method is cumbersome and not particularly suitable for the lower range of molecular weights. Another method for molecular weight determination is the measurement of inherent viscosity of the polymer. This measurement of inherent viscosity bears a direct relationship to the number average molecular weight for each class of polyoxymethylene, and it is used herein to characterize the polymers. The inherent viscosity (I.V.) is measured by dissolving 0.5 gram of the polymer in 100 milliliters of reagent grade phenol which has been purified by distillation from solid caustic. The polymer is not soluble in the pehnol at room temperature and usually the mixture is heated to 120° C. to increase the rate of solution of polymer. The viscosity of the phenol solvent and the viscosity of the phenol polymer solution is measured at 90° C. by noting the time required to pass the same volume of each material through an Ostwald viscometer. The inherent viscosity (I.V.) is then determined by using the following formula $$I.V. = \frac{2.303 \log \frac{\text{time of solution}}{\text{time of solvent}}}{\text{wt. of polymer in 100 cc. of phenol}}$$

This inherent viscosity may be correlated with the number average molecular weight of the polymer in each particular polymerization system in which correlation is made, e.g., an inherent viscosity of 1.0 corresponds to a number average molecular weight of 38,000, an I.V. of 1.2 corresponds to 50,000 and an I.V. of 0.5 corresponds to a number average molecular weight of 14,000 and an inherent viscosity of 0.4 corresponds to a number average molecular weight of about 10,000 for the majority of the polymers disclosed herein.

Several methods are available to determine intercalation of —C—C— linkages into the preformed polymer. A depression in melting point of the polymer of at least 4° C. (corrected for inherent viscosity) is a definite indication fo intercalation. The corrected melting point may be calculated from the observed melting point as measured by differential thermal analysis (method described hereinbelow) by applying the corrections given in the following table.

| Inherent viscosity: | Correction applied to the observed melting point, ° C. |
|---|---|
| 2.0 | −3 |
| 1.5 | −2 |
| 1.0 | 0 |
| 0.5 | 2 |

The melting point may be accurately determined by differential thermal analysis according to the general method described in the chapter, "Application of Differential Thermal Analysis to High Polymers," Organic Analysis, volume IV, page 361, Interscience Publishers, Inc. (1960). Using a Differential Thermal Analyzer, e.g., a Du Pont Model 900 adjusted to a heating rate of 10° C. per minute using glass beads as a reference, a sample of polymer is placed in a capillary tube 1.5–2.0 mm. in diameter and 2.5 cm. in length which is maintained under a nitrogen blanket. The polymer is heated to 15° C. above its original melting point. The sample is cooled for approximately five minutes until it reaches a temperature of about 130° C. When this temperature is reached, the sample is reheated and the melting point is observed. The melting points recorded in the examples were determined according to this procedure and are corrected as described above for the inherent viscosity of the particular polymer.

The treated polymer may be degraded under controlled conditions and the amount of intercalation determined from the condition of the polymer after the degradation.

The following examples serve to illustrate certain embodiments of this invention and are not intended to restrict the invention. Parts and percentages are based on weight unless otherwise specified.

Example 1

The starting polymer for this example was prepared according to the general process of United States Patent 2,994,687, issued on Aug. 1, 1961, to H. H. Goodman et al., by polymerizing formaldehyde in 610 parts of dry toluene containing approximately 60 parts of dry dioxolane at a temperature of from 55–60° C. using dimethyl di(hydrogenated tallow) ammonium acetate as a catalyst. The polymer from a 50 part portion of the slurry thus obtained was esterified according to known techniques and then found to have an inherent viscosity of 0.73, a base stability of substantially 0% and a melting point of 170° C. The remaining polymer slurry containing 10.6% solids (69 parts of polymer) was vigorously agitated and cooled to 25–30° C. while 0.15 part of boron trifluoride etherate was added. After a period of 19 minutes, 175 parts of the slurry were connected with approximately 240 parts of methanol and filtered. The polymer thus recovered (23.0 parts) was washed with acetone and dried in a vacuum oven for 16 hours at a temperature of 25° C. under a blanket of nitrogen. Approximately 4 parts of the dried polymer were contacted with 52 parts of benzyl alcohol containing 0.5 part of KOH and heated to 165° C. for 15 minutes with nitrogen agitation of the liquid following which the solution was cooled at 25–30° C. and the alcohol removed by suction filtration. The remaining solids were slurried with methanol and the slurry was filtered. The polymer recovered was washed with water and twice with acetone to remove any unreacted materials following which it was dried at 90–100° C. in a vacuum oven under a nitrogen blanket for 2.5 hours. Approximately 19% of the polymer originally charged was recovered. The recovered polymer exhibited an inherent viscosity of 0.71 and a melting point of 170° C. The foregoing example illustrates that the process of the present invention may be employed to enhance the base stability of the polymer without substantial modification of its physical properties.

Example 2

The starting material for this example was prepared according to the process disclosed in the aforementioned United States Patent 2,994,687, using dimethyl di(hydrogenated tallow) ammonium acetate as a catalyst, which polymer, after esterification with propionic anhydride, exhibited an inherent viscosity of 1.1 and was substantially 0% base stable. Approximately 50 parts of this polymer were charged to a flask along with 130 parts of dry toluene and 17 parts of dry dioxolane. The contents of the flask were stirred with a standard type of "Teflon" coated magnetic stirring bar. After the agitator was started, 0.09 part of triethyloxonium fluoborate was introduced into the reactor and the temperature was increased to 60° C. and maintained at that temperature for approximately 45 minutes. The slurry was cooled to room temperature and the polymer recovered by filtration, washed three times with approximately 200 parts of acetone each time, and dried in a vacuum oven at 70° C. for four hours. Approximately 50 parts by weight of polymer were recovered. Approximately 85.9% of the polymer was recovered when treated with the base as disclosed in Example 1. This base stable fraction exhibited an inherent viscosity of 0.55 and a melting point of 161° C. as compared to a melting point of the untreated polymer of 171° C. It should be apparent from the foregoing example that the process of the present invention may be employed to modify both the chemical and physical properties of the polymer, e.g., an increase in the base stable fraction and a decrease in the melting point of the polymer. This example demonstrates that the polymerization portion of the process may be conducted in the absence of the modifying reactant and that the polymer may be isolated between the polymerization and modification steps.

Example 3

The polymer employed in this example was prepared according to the following technique. Formaldehyde gas was generated by continuously pyrolyzing cyclohexyl hemiformal at approximately 150° C. and directing the pyrolysis vapors to a condenser, the temperature of which was regulated to condense cyclohexanol and water and to permit formaldehyde gas to pass through. The gas was then directed through a series of six U-tubes approximately 1 inch in diameter by 12 inches in height which were packed with stainless steel packing and maintained at a temperature of −18° C. by immersing approximately 10 inches of the lower portion of the U-tube in an acetone bath cooled by solid carbon dioxide. The vapors were then directed into a reactor which had been thoroughly dried and contained 157 parts of dry toluene and 21 parts of dry dioxolane. After saturating the toluene with formaldehyde, (approximately 2 minutes after introduction of the gas) 0.024 part of a lecithin (vegetable source) catalyst was added to the reaction medium and the temperature maintained at 40° C. for 10 minutes following which the introduction of formaldehyde was stopped. Approximately 0.034 part of boron trifluoride etherate was added to the slurry thus obtained and the temperature increased to 70° C. After maintaining that temperature for 30 minutes, the reaction was terminated by the addition of 1 part of triethylamine. The solid polymer was recovered by filtration and washed and dried as set forth in Example 2 to yield 13.5 parts of dry polymer. This polymer exhibited a base stable fraction of 76%, had an inherent viscosity of 0.57 and a melting point of 166° C. This example demonstrates chemical and physical modification of a polyoxymethylene which was originally prepared from a catalyst different from that set forth in the Examples 1 and 2.

Example 4

The polyoxymethylene was prepared as set forth in Example 3 except that 0.0018 part of tin tetrabromide was used as the polymerization catalyst and the polymerization was conducted at a temperature of 25° C. for a period of 20 minutes. After completion of the polymerization, the formaldehyde addition was stopped and 0.034 part of boron trifluoride etherate was added to the slurry and the temperature raised to 70° C. and maintained at that temperature for 30 minutes. The product was worked up as set forth in Example 3 and 21 parts of polymer were obtained. The treated product exhibited a base stable fraction of 89%, an inherent viscosity of 1.0 and a melting point as determined by differential thermal analysis of 163° C. It was determined by nuclear magnetic resonance measurement that approximately 2.6 mole percent of (—C—C—) linkages had been incorporated into the main chains of the starting polymer by the post-polymerization modification. The general procedure for nuclear magnetic resonance is outlined by G. Allen and K. Warren in Chemistry and Industry, Apr. 11, 1964. In this example, phenol was used in place of the p-chlorophenol disclosed in the procedure and the measurement was made with a "Varian" A–60 nuclear magnetic resonance spectrometer.

Example 5

The starting polymer for this example was a high molecular weight polyoxymethylene homopolymer which had been etherified by known techniques and precipitated from 1,4-dioxane. This reprecipitated, substantially 100% base stable polymer exhibited an inherent viscosity of 0.76 and a melting point of 171.5° C. Approximately 105 parts of this reprecipitated polymer were charged to the apparatus described in Example 1 which contained 370 parts of dry n-heptane and 60 parts of dry 1,3-dioxolane. The slurry thus obtained was heated to 70° C. and 0.11 part of boron trifluoride etherate was injected into the reactor and the reaction continued for 37 minutes, following which the polymer was recovered and treated according to the purification and base treatment shown in Example 1. The product exhibited a base stable fraction of 85%, an inherent viscosity of 0.47 and a melting point of 165.5° C. The foregoing example illustrates that a polymer obtained from solution precipitation which already possesses substantially 100% base stability, may be modified according to the process of the present invention, as evidenced by the decrease of melting point.

Additional experiments indicate that other reaction media may be employed, e.g., trichloroethylene, in place of the heptane or toluene disclosed in the foregoing examples.

Example 6

The following example illustrates the employment of polydioxolane as the modifying reactant in the process of the present invention. Approximately 31.8 parts of dry dioxolane were homopolymerized in a round-bottomed flask by introducing 0.069 part of boron trifluoride etherate into the dioxolane and heating at a temperature of 70° C. for approximately 20 minutes. The viscous sirup formed by the foregoing polymerization was diluted with 43.5 parts of dry toluene and added to a flask which contained 113 parts of dry toluene and 30 parts of a polyoxymethylene dimethylether homopolymer, which polymer exhibited an inherent viscosity of 1.57 and was substantially 100% base stable. The polyoxymethylene diether had a melting point of 170° C. The contents of the reactor were heated to 70° C. and maintained at that temperature for 20 minutes following which 2 parts of triethylamine were added to the reaction mixture to terminate the reaction. The mixture was cooled and the polymer isolated and purified according to Example 4. Approximately 29.4 parts of polymer were recovered which polymer exhibited a base stability of 78%, an inherent viscosity of 0.81, and a melting point of 168° C. It was determined by subjecting the polymer to controlled degradation that approximately 0.5 mole percent of (—C—C—) linkages had been inserted in the chain of the starting polymer.

Example 7

Formaldehyde monomer generated according to Example 3 was passed into a reactor which had been thoroughly dried and contained 61 parts of heptane. After saturating the heptane with formaldehyde (approximately two minutes after introduction of the gas) 0.012 part of lecithin was added to the reactor and the temperature maintained at 40° C. for 20 minutes. The polyoxymethylene made under these conditions has a base stability of essentially 0%. The flow of formaldehyde to the reactor was stopped, the temperature of the slurry reduced to 25° and 10.6 parts of liquid dioxolane followed by approximately 0.023 part of boron trifluoride etherate were added, with stirring, to the reactor. The slurry temperature was maintained at 25° C. for 18 hours. At the end of the 18-hour period, the reaction was terminated by adding one part of triethylamine. The solid polymer was separated by filtration, washed and dried as set forth in Example 2 to yield 5.4 parts of dry polymer. This polymer exhibited a base stable fraction of 79% and had an inherent viscosity of 0.43. Additional experiments indicated that phosphorus pentafluoride may be substituted for the boron trifluoride etherate as the catalyst in the process described in Example 7.

Example 8

Polyoxymethylene of the type employed in Example 1 having an inherent viscosity of 1.62 was dried by heating at a temperature of 170° C. and a pressure of about 2 mm. Hg for one hour. Approximately 8.8 parts of the dried polymer, 12.5 parts of dry heptane, 0.031 part of boron trifluoride butyl ether complex and 7.1 parts of cis-hexahydrobenzo-1,3-dioxolane (freshly distilled from lithium aluminum hydride) were mixed and the mixture was heated at 72° C. for a period of 20 minutes. The mixture was cooled and 0.7 part of tributylamine was added. The solid polymer was recovered by filtration and washed with 100 parts of methanol, 100 parts of acetone and dried at 70° C. for two hours. Approximately 8.8 parts of the modified polymer were recovered. The modified polymer was treated with base by forming a mixture of 2 parts of the polymer, 50 parts of benzyl alcohol, and 0.5 part of potassium hydroxide and heating the mixture to a temperature of 160° C. for 40 minutes. This mixture was then cooled and filtered and the recovered polymer was washed with 500 parts of a mixture of 3 parts of water, 1 part of methanol and 100 parts of acetone. Approximately 70% of the modified polymer originally charged to the base treatment was recovered. This polymer had an inherent viscosity of 0.93 and melted 8° C. below an unmodified base-stable polymer of the same inherent viscosity.

Example 9

A mixture was prepared comprising 6.1 parts of the dried polymer of Example 8, 3.6 parts of heptane, 14.0 parts of cis-hexahydrobenzo-1,3-dioxane (freshly distilled from lithium aluminum hydride) and 0.11 part of boron trifluoride-butyl ether complex. This mixture was heated at 70° for 20 minutes then cooled and treated with amine. Approximately 6.1 parts of modified polymer were recovered by the method of Example 8. Subsequently, 2.0 parts of this polymer were base treated. The base-treated polymer (58% of the polymer originally subjected to the base treatment) was worked up and as set forth in Example 8 found to have an inherent viscosity of 0.84 and a melting point of 4.5° C. lower than an unmodified polymer of the same inherent viscosity.

Example 10

A mixture comprising 8.6 parts of the dried polymer of Example 8, 9.4 parts of heptane, 10.2 parts of trans-hexahydrobenzo-1,3-dioxane (freshly distilled from LiAlH₄) and 0.26 part of boron trifluoride-butyl ether complex was heated at 72° C. for 60 minutes. The solution was cooled and treated with amine as in Example 8. The modified polymer was recovered, washed and base treated as in Example 8. The base-treated modified polymer (61% of the polymer originally subjected to the base treatment) had an inherent viscosity of 0.76 and melted 5° C. lower than an unmodified polymer of the same inherent viscosity.

Example 11

A mixture comprising 8.7 parts of the dried polymer of Example 8, 8.6 parts of heptane, 12.5 parts of trans-hexahydrobenzotrioxepane and 0.028 part of boron trifluoride-butyl ether complex was heated at 72° C. for 20 minutes. The solution was then cooled and treated with amine as in Example 8. The modified polymer was recovered and treated with base as in Example 8. The modified base-stable polymer (76% of the polymer subjected to the base treatment) had an inherent viscosity of 0.97, and melted 9° C. lower than an unmodified polymer of the same inherent viscosity. Analysis of the modified base-treated polymer by controlled degradation indicated the presence of 0.5 mole percent of —C—C— linkages.

Example 12

Example 11 was repeated except that the initial mixture was heated at 92° C. for 20 minutes. The modified base-stable polymer (81% of the polymer originally subjected to the base treatment) had an inherent viscosity of 0.79, and melted 9° C. lower than an unmodified polymer of the same inherent viscosity.

Example 13

A mixture comprising 8.8 parts of the dried polymer of Example 8, 8.9 parts of heptane, 13.8 parts of 4-phenyl-1,3-dioxane and 0.017 part of phosphorus pentafluoride was heated at 72° for 20 minutes. The modified polymer was recovered and treated with base as in Example 8. The modified base-stable polymer (47% of the polymer subjected to the base treatment) had an inherent viscosity of 0.85, and melted 5.5° C. lower than an unmodified polymer of the same inherent viscosity.

Example 14

A mixture comprising 8.9 parts of the dried polymer of Example 8, 8.1 parts of heptane, 13.7 parts of 4-phenyl-1,3-dioxane and 0.088 part of boron trifluoride gas was heated at 72° C. for 20 minutes. The modified polymer was recovered and treated with base as in Example 8. The modified base-stable polymer (75% of the polymer originally subjected to the base treatment) had an inherent viscosity of 0.72, and melted 8.5° C. lower than an unmodified polymer of the same inherent viscosity. Analysis of the base-treated polymer by controlled degradation indicated the presence of 0.65 mole percent of —C—C— linkages.

Example 15

A mixture comprising 9.0 parts of the dried polymer of Example 8, 9.7 parts of n-heptane, 11.1 parts of 5-methyl-5-carbethoxy-1,3-dioxane, and 0.051 part of boron trifluoride-butyl ether complex was heated at 72° C. for 20 minutes. The mixture was cooled and 0.7 part of tributylamine was added. The modified polymer was recovered by filtration, washed with 100 parts of chloroform, 100 parts of methanol and 100 parts of acetone and dried at 70° C. under vacuum for 2 hours. Approximately 9.0 parts of modified polymer were recovered. This product was heated at 160° C. in 200 ml. of benzyl alcohol containing 8 ml. of tributylamine for 30 minutes during which time the polymer dissolved. The solution was cooled to room temperature and the polymer which precipitated was recovered by filtration. The modified base-stable polymer (68% of the modified polymer subjected to the alcohol-amine treatment) had an inherent viscosity of 0.79 and melted 5° C. below an unmodified polymer of the same inherent viscosity. Infrared analysis indicated approximately 0.35 mole percent ester groups. Subsequent treatment of this base-stable polymer in KOH/benzyl alcohol as in Example 8 above resulted in a modified polymer containing carboxylate and acid groups by infrared having an inherent viscosity of 0.78 and melting 5° C. below an unmodified polymer of the same viscosity.

We claim:

1. A process for modifying polyoxymethylene which comprises reacting in a mildly acidic reaction medium, a polyoxymethylene having a number average molecular weight of at least 10,000 with a formal selected from the class consisting of formals of the formulae (1) 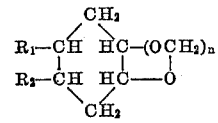

wherein R₁ and R₂ are hydrogen or alkyl groups of 1–3 carbon atoms and when R₁ is hydrogen, R₂ is aryl or alkaryl groups having 6–10 carbon atoms, and n is 1 or 2;

(2) 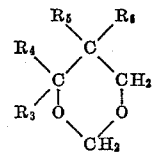

wherein R₃ is a group selected from the class consisting of phenyl, —(CH₂)ₘ—CN, —(CH₂)ₘ—COOR and hydrogen, wherein $m$ is 0-3 and R is an alkyl group having 1-4 carbon atoms, $R_4$ and $R_5$ are selected from the class consisting of hydrogen and alkyl groups having 1-4 carbon atoms, $R_6$ is selected from the class consisting of hydrogen and when $R_3$ is hydrogen, $R_6$ is a group selected from the class consisting of phenyl, —$(CH_2)_m$—CN, and —$(CH_2)_m$—COOR, wherein $m$ is 0-3 and R is an alkyl group having 1-4 carbon atoms; and (3) 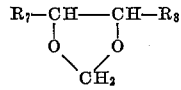

wherein $R_7$ is hydrogen or an alkyl group having 1-4 carbon atoms and $R_8$ is a group selected from the class —$(CH_2)_m$—CN and —$(CH_2)_m$—COOR, wherein $m$ is 0-3 and R is an alkyl group having 1-4 carbon atoms; at a temperature of 0 to 200° C. whereby at least one carbon to carbon linkage derived from said formal is inserted in the main chain of the polyoxymethylene, and thereafter recovering a polyoxymethylene having a number average molecular weight of at least 10,000 and having modified properties as compared to the starting polyoxymethylene.

2. The process of claim 1 wherein the reaction is conducted at a temperature range 25 to 150° C.

3. The process of claim 2 wherein the reaction is conducted in the presence of boron trifluoride dibutyl etherate.

4. The process of claim 3 wherein the polyoxymethylene starting polymer has a predominance of oxymethylene units comprising the polymer chain and has 1 to 2 of its terminal valences satisfied with a hydroxyl group.

5. The process of claim 4 wherein the modified polyoxymethylene is treated with a base.

6. The process of claim 5 conducted in the presence of an inert normally liquid hydrocarbon in the range 40 to 80° C. and wherein a modified polyoxymethylene is contacted with ammonium hydroxide in the presence of an alcohol.

References Cited

UNITED STATES PATENTS

| | | | |
|---|---|---|---|
| 2,394,910 | 2/1946 | Gresham | 260—2 |
| 3,183,211 | 5/1965 | Brinker et al. | 260—67 |
| 3,252,939 | 5/1966 | Small | 260—67 |

HAROLD D. ANDERSON, Primary Examiner

L. M. PHYNES, Assistant Examiner

U.S. Cl. X.R.

260—823